(12) United States Patent
Kato

(10) Patent No.: US 12,139,596 B2
(45) Date of Patent: Nov. 12, 2024

(54) THERMOPLASTIC RESIN COMPOSITION AND METHOD FOR PRODUCING SAME, MOLDED ARTICLE AND METHOD FOR MANUFACTURING SAME, AND MODIFYING AGENT AND MODIFICATION METHOD

(71) Applicant: TOYOTA BOSHOKU KABUSHIKI KAISHA, Aichi (JP)

(72) Inventor: Keisuke Kato, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 676 days.

(21) Appl. No.: 17/421,662

(22) PCT Filed: Nov. 20, 2019

(86) PCT No.: PCT/JP2019/045515
§ 371 (c)(1),
(2) Date: Jul. 8, 2021

(87) PCT Pub. No.: WO2020/152964
PCT Pub. Date: Jul. 30, 2020

(65) Prior Publication Data
US 2022/0073719 A1 Mar. 10, 2022

(30) Foreign Application Priority Data
Jan. 24, 2019 (JP) ................................. 2019-010642

(51) Int. Cl.
C08L 23/12 (2006.01)
B29C 45/00 (2006.01)
C08J 3/12 (2006.01)
C08L 23/08 (2006.01)
C08L 23/16 (2006.01)
C08L 23/26 (2006.01)
C08L 53/00 (2006.01)
C08L 77/02 (2006.01)
C08L 77/06 (2006.01)

(52) U.S. Cl.
CPC .......... *C08L 23/12* (2013.01); *B29C 45/0001* (2013.01); *C08J 3/12* (2013.01); *C08L 23/0815* (2013.01); *C08L 23/16* (2013.01); *C08L 23/26* (2013.01); *C08L 53/00* (2013.01); *C08L 77/02* (2013.01); *C08L 2203/30* (2013.01); *C08L 2205/025* (2013.01); *C08L 2205/035* (2013.01); *C08L 2205/22* (2013.01); *C08L 2207/04* (2013.01)

(58) Field of Classification Search
CPC .................... C08L 2205/025; C08L 2205/035
See application file for complete search history.

(56) References Cited

U.S. PATENT DOCUMENTS

| | | | | |
|---|---|---|---|---|
| 3,465,060 A | * | 9/1969 | Oldham | ................ C08L 77/00 |
| | | | | 528/329.1 |
| 2018/0305535 A1 | | 10/2018 | Matsumoto et al. | |
| 2018/0334560 A1 | * | 11/2018 | Kito | ................ C08L 23/14 |
| 2019/0284380 A1 | | 9/2019 | Kato | |
| 2019/0382569 A1 | | 12/2019 | Kato | |
| 2019/0390053 A1 | | 12/2019 | Kato | |
| 2020/0216648 A1 | * | 7/2020 | Kato | ................ C08L 77/00 |

FOREIGN PATENT DOCUMENTS

| WO | 2017/111100 | 6/2017 | |
|---|---|---|---|
| WO | WO-2017094737 A1 * | 6/2017 | ............... C08J 3/20 |
| WO | 2018/021569 | 2/2018 | |
| WO | 2018/139378 | 8/2018 | |
| WO | 2018/139379 | 8/2018 | |

OTHER PUBLICATIONS

Product data sheet for Ultramid B3S (no date).*
Office Action for CN App. No. 201980087745.7, dated Feb. 28, 2023 (w/ translation).
Office Action for JP App. No. 2020-567383, dated Aug. 1, 2023 (w/ translation).
Office Action for JP App. No. 2020-567383, dated Feb. 14, 2023 (w/ translation).
International Search Report issued in International Patent Application No. PCT/JP2019/045515, dated Feb. 25, 2020, along with English language translation.

(Continued)

*Primary Examiner* — Marc S Zimmer
(74) *Attorney, Agent, or Firm* — Greenblum & Bernstein, P.L.C

(57) ABSTRACT

The thermoplastic resin composition includes (A) a first polyolefin resin with a number average molecular weight of less than 350,000, (B) a second polyolefin resin with a number average molecular weight of 350,000 or more, (C) a polyamide resin having a structure in which a carbon number of a linear chain part of a hydrocarbon group sandwiched between adjacent amide bonds in its main chain is 5 or less, and (D) a modified elastomer having a reactive group with the polyamide resin (C). A total content ratio of the component (A) and (B) is 70% by mass or more, when a total amount of the component (A), (B), (C), and (D) is 100% by mass, and a content ratio of the component (A) is 50% by mass or more and 87% by mass or less, when a total amount of the component (A) and (B) is 100% by mass.

7 Claims, 2 Drawing Sheets

(56) References Cited

OTHER PUBLICATIONS

Office Action for CN App. No. 201980087745.7, dated Aug. 10, 2023 (w/ translation).
Office Action for CN App. No. 201980087745.7, dated Nov. 8, 2023 (w/ translation).
Office Action for DE App. No. 112019006741.9, dated Oct. 27, 2021 (w/ translation).
Office Action for JP App. No. 2023-185718, dated Jun. 25, 2024 (w/ translation).

* cited by examiner

[FIG. 1]
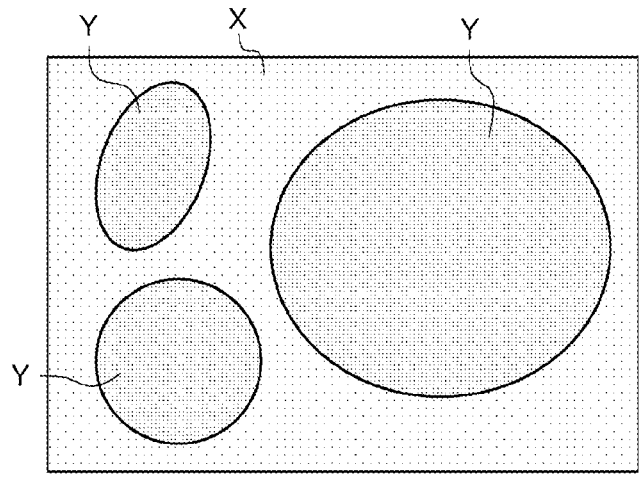
[FIG. 2]
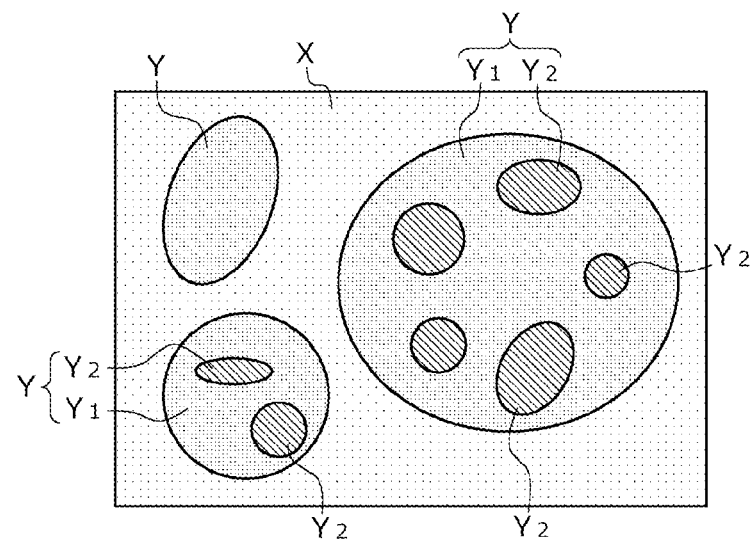

[FIG. 3]
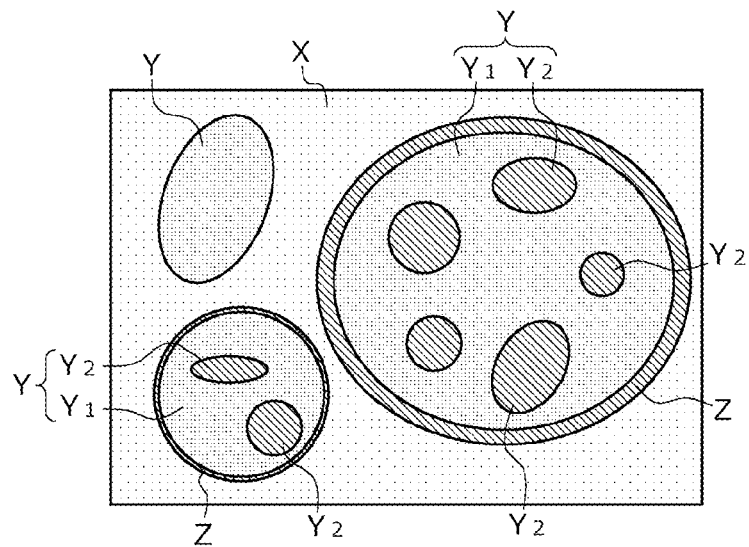
[FIG. 4]
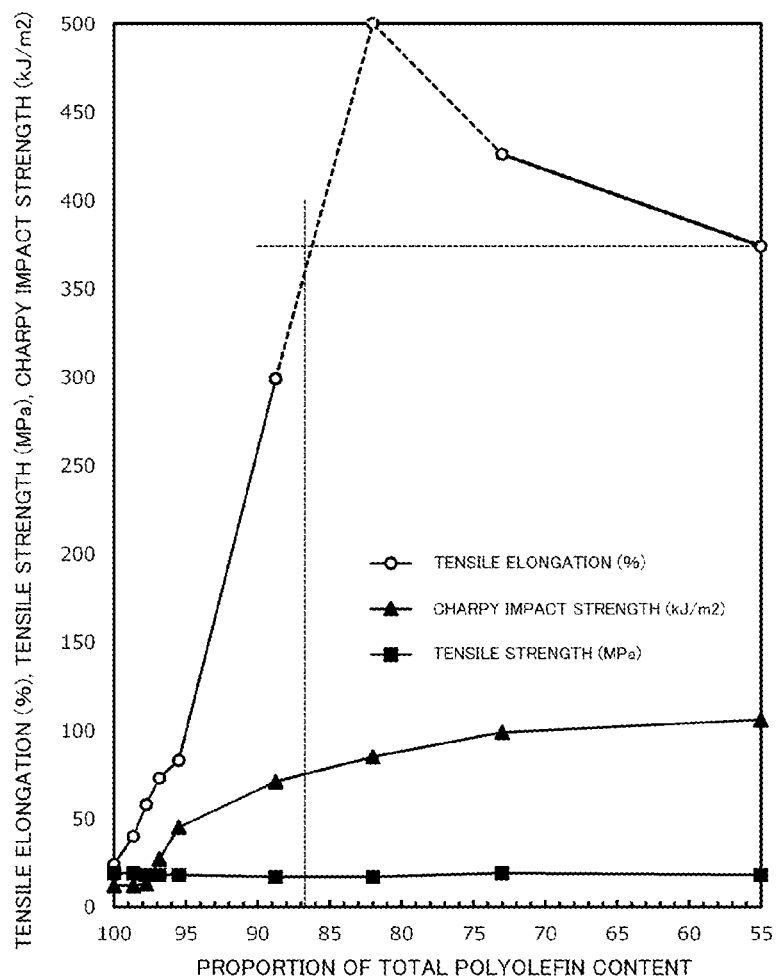

THERMOPLASTIC RESIN COMPOSITION AND METHOD FOR PRODUCING SAME, MOLDED ARTICLE AND METHOD FOR MANUFACTURING SAME, AND MODIFYING AGENT AND MODIFICATION METHOD

TECHNICAL FIELD

The present invention relates to a thermoplastic resin composition and a method for producing the same, a molded article and a method for producing the same, and a modifying agent and a modification method. More specifically, the present invention relates to a thermoplastic resin composition containing a polyolefin, a polyamide, and a modified elastomer and a method for producing the same, a molded article and a method for producing the same, and a modifying agent and a modification method.

BACKGROUND ART

The present inventor disclosed, in Patent Literature 1, that when a polyolefin resin with a number average molecular weight of 350,000 or more and a polyamide resin having a short chain structure in which a carbon number of a linear chain part between amide bonds is 5 or less are used in combination for a thermoplastic resin composition containing a polyolefin resin, a polyamide resin, and a modified elastomer, the thermoplastic resin composition having excellent impact resistance could be obtained. Further, the present inventor disclosed, in Patent Literatures 2 and 3, that impact resistance of a molded article obtained using the thermoplastic resin composition of Patent Literature 1 could be improved.

CITATIONS LIST

Patent Literature

Patent Literature 1: WO 2018/021569
Patent Literature 2: WO 2018/139378
Patent Literature 3: WO 2018/139379

SUMMARY OF INVENTION

Technical Problems

However, Patent Literatures 1 to 3 do not focus on or disclose tensile elongation.

An object of the present invention is to provide a thermoplastic resin composition having improved tensile elongation and a method for producing the same, a molded article and a method for producing the same, and a modifying agent and a modification method for improving the tensile elongation of a polyolefin resin.

Solutions to Problems

As disclosed in Patent Literature 1, the present inventor found that when a polyolefin resin with a number average molecular weight of 350,000 or more was selected as a component (B) and a polyamide resin having a short chain structure in which a carbon number of a linear chain part between amide bonds is 5 or less was selected as a component (C) for a thermoplastic resin composition containing components (B) to (D), the thermoplastic resin composition having excellent impact resistance could be obtained.

As a result of a further study on the technique, the present inventor found that the impact resistance could be improved when the composition described in Patent Literature 1 was added to other polyolefin resin, and disclosed the technique in Patent Literatures 2 to 3.

After that, as a result of further studies, the present inventor has found that, as for the above-described impact resistance, the modifying agent itself has the highest impact resistance; and that, when the modifying agent is added to other polyolefin, the resultant impact resistance is not beyond the inherent impact resistance of the modifying agent itself, but shows a behavior of increasing depending on the amount of the modifying agent added, whereas the tensile elongation shows a completely different peculiar behavior. That is, the inventor has found that, as for the tensile elongation, when the modifying agent is added to other polyolefin, the resultant tensile elongation may be extremely high beyond the inherent tensile elongation of the modifying agent itself, and finally has completed the present invention.

That is, the present invention is as follows.

(1) The thermoplastic resin composition of the present invention is characterized in that the composition comprises:
   (A) a first polyolefin resin with a number average molecular weight of less than 350,000;
   (B) a second polyolefin resin with a number average molecular weight of 350,000 or more;
   (C) a polyamide resin having a structure in which a carbon number of a linear chain part of a hydrocarbon group sandwiched between adjacent amide bonds in its main chain is 5 or less; and
   (D) a modified elastomer having a reactive group with the polyamide resin (C);
   that a total content ratio of the component (A) and the component (B) is 70% by mass or more, when a total amount of the component (A), the component (B), the component (C), and the component (D) is 100% by mass,
   that a content ratio of the component (A) is 50% by mass or more and 87% by mass or less, when a total amount of the component (A) and the component (B) is 100% by mass, and
   that a tensile elongation is 50% or higher.

(2) In the thermoplastic resin composition of the present invention, a content ratio of the component (D) may be 50% by mass or more, when a total amount of the component (C) and the component (D) is 100% by mass.

(3) In the thermoplastic resin composition of the present invention, the component (C) may be selected from a group consisting of nylon 6, nylon 66, nylon 46, nylon 6T, nylon 6I, nylon M5T, nylon M5I, and copolymers thereof.

(4) In the thermoplastic resin composition of the present invention, the component (D) may be an olefin-based thermoplastic elastomer having a skeleton of a copolymer of ethylene or propylene and an α-olefin having 3 to 8 carbon atoms, or a styrene-based thermoplastic elastomer having a styrene skeleton.

(5) The production method of the thermoplastic resin composition is characterized by comprising:
   a second composition preparation step in which the component (B) and a first composition obtained by melt-kneading the component (C) and the component (D) are subjected to melt-kneading to obtain a second composition; and
   a third composition preparation step in which the component (A) and the second composition are subjected to melt-kneading to obtain a third composition.

(6) The molded article of the resent invention is characterized by comprising, as a resin component, the thermoplastic resin composition.

(7) The production method of the molded article of the present invention is characterized by comprising:
- a third composition preparation step in which the component (A) and a second composition comprising the component (B), the component (C) and the component (D) are subjected to melt-kneading to obtain a third composition; and
- a molding step in which the third composition is subjected to molding to obtain the molded article.

(8) The production method of the molded article of the present invention is characterized by comprising a molding step in which a melt-kneaded product of the component (A) and a second composition comprising the component (B), the component (C) and the component (D) is subjected to molding to obtain the molded article.

(9) In the production method of the molded article of the present invention, the second composition may be a composition obtained by melt-kneading the component (B) and a first composition obtained by melt-kneading the component (C) and the component (D).

(10) The modifying agent of the present invention is one that improves a tensile elongation of a resultant thermoplastic resin composition to 50% or higher by being added to (A) a first polyolefin resin with a number average molecular weight of less than 350,000, an is characterized by comprising:
- (B) a second polyolefin resin with a number average molecular weight of 350,000 or more;
- (C) a polyamide resin having a structure in which a carbon number of a linear chain part of a hydrocarbon group sandwiched between adjacent amide bonds in its main chain is 5 or less; and
- (D) a modified elastomer having a reactive group with the polyamide resin (C).

(11) In the modifying agent of the present invention, a content ratio of the component (D) may be 50% by mass or more, when a total content of the component (C) and the component (D) is 100% by mass.

(12) In the modifying agent of the present invention, a content ratio of the component (B) may be 45% by mass or more and 65% by mass or less, when a total content of the component (B), the component (C), and the component (D) is 100% by mass.

(13) The modification method of the present invention is one in which a modifying agent is added to (A) a first polyolefin resin with a number average molecular weight of less than 350,000 to improve a tensile elongation of a resultant thermoplastic resin composition at 50% or higher, characterized by comprising
adding the modifying agent to the first polyolefin resin (A),
wherein the modifying agent comprises:
- (B) a second polyolefin resin with a number average molecular weight of 350,000 or more;
- (C) a polyamide resin having a structure in which a carbon number of a linear chain part of a hydrocarbon group sandwiched between adjacent amide bonds in its main chain is 5 or less; and
- (D) a modified elastomer having a reactive group with the polyamide resin (C).

(14) In the modification method of the present invention, the modifying agent may be added so that:
a total amount ratio of the component (A) and the component (B) is 70% by mass or more, when a total amount of the component (A), the component (B), the component (C), and the component (D) is 100% by mass, and
an amount ratio of the component (A) is 50% by mass or more and 87% by mass or less, when a total amount of the component (A) and the component (B) is 100% by mass.

(15) In the modification method of the present invention, the modifying agent may be added so that an amount ratio of the modifying agent is more than 20% by mass and less than 75% by mass, when a total amount of the component (A) and the modifying agent is 100% by mass.

Advantageous Effects of Invention

According to the thermoplastic resin composition and the molded article in the present invention, higher tensile elongation can be obtained.

According to the method for producing the thermoplastic resin composition and the method for producing the molded article in the present invention, a thermoplastic resin composition and a molded article having higher tensile elongation can be obtained.

According to the modifying agent and the modification method in the present invention, the tensile elongation of the resultant thermoplastic resin composition can be improved. That is, modification can be made so as to improve the tensile elongation of the resultant polyolefin-based resin composition.

BRIEF DESCRIPTION OF DRAWINGS

FIG. 1 is an explanatory diagram for explaining an example of a phase structure.

FIG. 2 is an explanatory diagram for explaining other example of the phase structure.

FIG. 3 is an explanatory diagram for explaining other example of the phase structure.

FIG. 4 is a graph showing a relationship between a polyolefin content and tensile elongation, tensile strength, or impact strength for Experimental Examples 1 to 9.

DESCRIPTION OF EMBODIMENTS

Subjects shown herein are illustrative one and one for describing embodiments of the present invention exemplarily, and are described for providing one believed to be explanation in which the principles and conceptual characteristics of the invention can be understood most effectively and without any difficulty. In this point, the embodiments are necessary for fundamental comprehension of the present invention and how some embodiments of the present invention are embodied in practice is clearly shown to those skilled in the art by an explanation in connection with drawings without intending to indicate a structural detail of the present invention above a certain level.

1. Thermoplastic Resin Composition

The thermoplastic resin composition of the present invention (hereinafter, also referred to simply as "the present composition") is characterized in that the composition contains: (A) a first polyolefin resin with a number average molecular weight of less than 350,000; (B) a second polyolefin resin with a number average molecular weight of 350,000 or more; (C) a polyamide resin having a structure in which a carbon number of a linear chain part of a hydrocarbon group sandwiched between adjacent amide bonds in its main chain is 5 or less; and (D) a modified elastomer having a reactive group with the polyamide resin (C), that a total content ratio of the component (A) and the component (B) is 70% by mass or more when a total amount of the component (A) to the component (D) is 100% by mass, that a content ratio of the component (A) is 50% by mass or more and 87% by mass or less when a total amount of the component (A) and the component (B) is 100% by mass, and that a tensile elongation is 50% or higher.

<1> Components (1) First Polyolefin Resin (A)

The first polyolefin resin (A) (hereinafter, also referred to simply as "component (A)") is a polyolefin resin with a number average molecular weight of less than 350,000. This component (A) may be a homopolymer of an olefin, a copolymer of olefins, or a mixture thereof.

The olefin constituting the component (A) is not particularly limited, and example thereof includes ethylene, propylene, 1-butene, 3-methyl-1-butene, 1-pentene, 3-methyl-1-pentene, 4-methyl-1-pentene, 1-hexene, 1-octene, and the like. These compounds may be used singly or in combination of two or more types thereof.

That is, examples of the component (A) include polyethylene resin, polypropylene resin, poly(1-butene) resin, poly(1-hexene) resin, poly(4-methyl-1-pentene) resin, and the like. These polymers may be used singly or in combination of two or more types thereof. The component (A) may be a mixture of the above polymers.

Examples of the polyethylene resin include a homopolymer of ethylene and a copolymer of ethylene and other olefin(s). These polymers may be used singly or in combination of two or more types thereof. Examples of the other olefin constituting the ethylene copolymer include propylene, 1-butene, 3-methyl-1-butene, 1-pentene, 3-methyl-1-pentene, 4-methyl-1-pentene, 1-hexene, 1-octene, and the like. The ethylene copolymer may be a copolymer in which at least one of other olefins are copolymerizable monomers. Examples of the ethylene copolymer include an ethylene propylene copolymer, an ethylene 1-butene copolymer, an ethylene 1-hexene copolymer, an ethylene 1-octene copolymer, an ethylene 4-methyl-1-pentene copolymer, and the like (provided that a unit derived from ethylene constitutes 50% or more of the total number of constituent units). These ethylene copolymers may be a random copolymer or a block copolymer. These copolymers may be used singly or in combination of two or more types thereof.

Examples of the polypropylene resin include a homopolymer of propylene and a copolymer of propylene and other olefin(s). These polymers may be used singly or in combination of two or more types thereof. Examples of the other olefin constituting the propylene copolymer include ethylene, 1-butene, 3-methyl-1-butene, 1-pentene, 3-methyl-1-pentene, 4-methyl-1-pentene, 1-hexene, 1-octene, and the like. The propylene copolymer may be a copolymer in which at least one of other olefins are copolymerizable monomers. Examples of the propylene copolymer include a propylene ethylene copolymer, a propylene 1-butene copolymer, a propylene 1-hexene copolymer, a propylene 1-octene copolymer, a propylene 4-methyl-1-pentene copolymer, and the like (provided that a unit derived from propylene constitutes 50% or more of the total number of constituent units). These propylene copolymers may be a random copolymer or a block copolymer. These copolymers may be used singly or in combination of two or more types thereof.

In the present composition, as described above, any polyolefin resin may be used as the component (A). Further, the component (A) may be a homopolymer or a copolymer. For example, the propylene homopolymer (polypropylene homopolymer) may be a main component (which may be contained in an amount of 70% by mass or more, or may be 100% by mass with respect to the total amount of the component (A)). The propylene copolymer (polypropylene copolymer) may be a main component (which is usually contained in an amount of 70% by mass or more, or may be 100% by mass with respect to the total amount of the component (A)). The component (A) may be used singly or in combination of two or more types thereof.

The propylene copolymer may be a random copolymer (random copolymer polypropylene) or a block copolymer (block copolymer polypropylene). Of these, the block copolymer is preferable from a viewpoint of excellent impact resistance. In particular, a propylene ethylene block copolymer in which another olefin is ethylene is preferable. This propylene ethylene block copolymer is a block copolymerized polypropylene having an ethylene block as a dispersed phase. That is, it is a polypropylene resin in which homopolypropylene forms a continuous phase and a dispersed phase containing polyethylene is present in the continuous phase. Such block copolymer polypropylene having an ethylene block as a dispersed phase is also referred to as, for example, impact copolymer, polypropylene impact copolymer, heterophasic polypropylene, heterophasic block polypropylene, and the like.

The component (A) is different from a modified elastomer in that it does not have an affinity for the component (C) and does not have a reactive group capable of reacting with the component (C).

In the present composition, the number average molecular weight of the component (A) is less than 350,000. When the number average molecular weight of the component (A) is less than 350,000, the tensile elongation of the present composition can be significantly increased. The number average molecular weight of the component (A) may be 330,000 or less, and further 300,000 or less. The number average molecular weight of the component (A) may be 10,000 or more, further 100,000 or more, and furthermore 150,000 or more.

The number average molecular weight of the component (A) is a number average molecular weight on polystyrene equivalent basis by gel permeation chromatography (GPC). When the component (A) is a homopolymer, each numerical range of the above number average molecular weight can be read as a numerical range of the weight average molecular weight.

A melt flow rate (MFR) of the component (A) is not particularly limited. Since the molecular weight (including the number average molecular weight) of the component (A) and the MFR are proportional to each other, the MFR of the component (A) is usually larger than the MFR of the component (B).

Specifically, the MFR of the component (A) may be 10 g/10 min or more. The MFR is preferably 12 g/10 min or more, and more preferably 14 g/10 min or more. The MFR of the component (A) may be 1,500 g/10 min or less, preferably 1,000 g/10 min or less, and more preferably 500 g/10 min or less.

The MFR of the polyolefin resin is measured under conditions of a temperature of 230° C. and a load of 21.18 N (2.16 kgf) according to JIS K 7210.

(2) Second Polyolefin Resin (B)

The second polyolefin resin (B) (hereinafter, also simply referred to as "component (B)") is a polyolefin resin with a number average molecular weight of 350,000 or more. This component (B) may be a homopolymer of an olefin, a copolymer of olefins, or a mixture thereof.

The olefin constituting the component (B) is not particularly limited, and those exemplified as the olefin constituting the component (A) may be similarly used. Further, polyolefins exemplified as the component (A) can be similarly used as the component (B).

In the present composition, as described above, any polyolefin resin may be used as the component (B). Further, the component (B) may be a homopolymer or a copolymer. For example, the propylene homopolymer (polypropylene homopolymer) may be a main component (which may be contained in an amount of 70% by mass or more, or may be 100% by mass with respect to the total amount of the component (B)). The propylene copolymer (polypropylene copolymer) may be a main component (which may be usually contained in an amount of 70% by mass or more, or may be 100% by mass with respect to the total amount of the component (B)).

The propylene copolymer may be a random copolymer (random copolymer polypropylene) or a block copolymer (block copolymer polypropylene). Of these, the block copolymer is preferable from a viewpoint of excellent impact resistance, as in the case of the component (A).

The component (B) is different from a modified elastomer in that it does not have an affinity for the component (C) and does not have a reactive group capable of reacting with the component (C).

In the present composition, the number average molecular weight of the component (B) is 350,000 or more. When the number average molecular weight of the component (B) is 350,000 or more, the interface between the components (B) can be reduced, which is considered to be advantageous in the present invention. Further, it is considered that, when the present composition has a predetermined phase structure (which will be described later), the impact resistance can be remarkably improved even if the dispersion diameter of the dispersed phase therein remains relatively large. This effect is not expressed when a polyamide resin having a structure in which the carbon number of a linear chain part of the hydrocarbon group sandwiched between adjacent amide bonds in its main chain is 6 or more is used, and is uniquely expressed only when a polyamide resin having a structure having in which the carbon number of a linear chain part is 5 or less is used.

In the present composition, the number average molecular weight of the component (B) is preferably 370,000 or more, more preferably 400,000 or more, further preferably 430,000 or more, furthermore preferably 450,000 or more, still further preferably 470,000 or more, still furthermore preferably 490,000 or more, particularly 500,000 or more, further 505,000 or more, and furthermore 510,000 or more. On the other hand, the upper limit of the number average molecular weight is not particularly limited, but may be, for example, 700,000 or less.

The number average molecular weight of the polyolefin resin is a number average molecular weight on polystyrene equivalent basis by gel permeation chromatography (GPC). When the component (B) is a homopolymer, each numerical range of the above number average molecular weight can be read as a numerical range of the weight average molecular weight.

A melt flow rate (MFR) of the component (B) is not particularly limited. Since the molecular weight (including the number average molecular weight) of the component (B) and the MFR are proportional to each other, the MFR of the component (A) is usually larger than the MFR of the component (B).

Specifically, the MFR of the component (B) may be 25 g/10 min or less. The MFR is preferably 22 g/10 min or less, more preferably 19 g/10 min or less, further preferably 16 g/10 min or less, furthermore preferably 13 g/10 min or less, still further preferably 10 g/10 min or less, still furthermore preferably 9 g/10 min or less, and particularly 8 g/10 min or less. The MFR of the component (B) may be 1 g/10 min or more, preferably 1.5 g/10 min or more, and more preferably 2 g/10 min or more.

The MFR of the polyolefin resin is measured under conditions of a temperature of 230° C. and a load of 21.18 N (2.16 kgf) according to JIS K 7210.

(3) Polyamide Resin (C)

The polyamide resin (C) (hereinafter, also referred to simply as "component (C)") is a polymer having a chain skeleton in which a plurality of monomers is polymerized via an amide bond (—NH—CO—).

In the present composition, the component (C) has a structure in which the carbon number of a linear chain part of the hydrocarbon group sandwiched between adjacent amide bonds in its main chain is 5 or less (hereinafter, referred to simply as "short chain structure" in the present invention). That is to say, a polyamide molecule has a short chain structure.

The following structures (1) to (6) are exemplified as the structure in which the above-mentioned carbon number of a linear-chain part is 5.

(1)  —NHCO—$CH_2$—$CH_2$—$CH_2$—$CH_2$—$CH_2$—NHCO—
(2)  —CONH—$CH_2$—$CH_2$—$CH_2$—$CH_2$—$CH_2$—NHCO—
(3)  —NHOC—$CH_2$—$CH_2$—$CH_2$—$CH_2$—$CH_2$—CONH—
(4) —NHCO—$CH_2$—$CH_2$—$CH_2$—$CH_2(CH_3)$—$CH_2$—NHCO—
(5) —CONH—$CH_2$—$CH_2$—$CH_2$—$CH_2(CH_3)$—$CH_2$—NHCO—
(6) —NHOC—$CH_2$—$CH_2$—$CH_2$—$CH_2(CH_3)$—$CH_2$—CONH—

The following structures (7) to (12) are exemplified as the structure in which the above-mentioned carbon number of a linear-chain part is 4.

(7) —NHCO—$CH_2$—$CH_2$—$CH_2$—$CH_2$—NHCO—
(8) —CONH—$CH_2$—$CH_2$—$CH_2$—$CH_2$—NHCO—
(9) —NHOC—$CH_2$—$CH_2$—$CH_2$—$CH_2$—CONH—
(10)  —NHCO—$CH_2$—$CH_2$—$CH_2(CH_3)$—$CH_2$—NHCO—
(11)  —CONH—$CH_2$—$CH_2$—$CH_2(CH_3)$—$CH_2$—NHCO—
(12)  —NHOC—$CH_2$—$CH_2$—$CH_2(CH_3)$—$CH_2$—CONH—

In the present composition, a polyamide resin having only a short chain structure can be used as the component (C). Specific examples of polyamide resin having only a short chain structure include nylon 6 (PA6, polyamide 6), nylon 66 (PA66, polyamide 66), nylon 46 (PA46, polyamide 46), copolymers thereof, and the like. These may be used singly or in combination of two or more types thereof.

Examples of the above-mentioned copolymers include nylon 6/66 (PA6/66, nylon 6/66), and the like. These may be used singly or in combination of two or more types thereof.

Further, the component (C) according to the present composition may have, at the same time in addition to the short chain structure, a structure in which the hydrocarbon group sandwiched between adjacent amide bonds in the main chain is a phenylene group or a substituent thereof (hereinafter, referred to simply as "phenylene structure").

The phenylene group (—C$_6$H$_4$—) is a residue obtained by eliminating two hydrogen atoms from benzene (C$_6$H$_6$), and may be any of a 1,2-phenylene group, a 1,3-phenylene group, and a 1,4-phenylene group. These may be used singly, or may be used in combination of two or more thereof. In addition, in the substituent (—C$_6$H$_3$(R)—) of the phenylene group, the carbon number of the main chains of the hydrocarbon groups sandwiched between adjacent amide bonds in the main chain is usually 6 or more and 10 or less. That is, examples of the substituted phenylene group include a methylene phenylene group, a dimethylene phenylene group, an ethylene phenylene group, and the like. These substituted phenylene group may be included singly or in combination of two or more types thereof.

As the component (C) according to the present composition, a polyamide resin having only a short chain structure and a phenylene structure can be used.

Specific examples of polyamide resin having only a short chain structure and a phenylene structure include nylon 6T (PA6T, polyamide 6T), nylon 6I (PA6I, polyamide 6I), nylon M5T (PAM5T, polyamide M5T), nylon M5I (PAM5I, polyamide M5I), copolymers thereof, and the like. These may be used singly or in combination of two or more types thereof.

Examples of the above-mentioned copolymer include nylon 6T/66 (PA6T/66, nylon 6T/66), nylon 6T/6I (PA6T/6I, polyamide 6T/6I), nylon 6T/6I/66 (PA6T/6I/66, polyamide 6T/6I/66), nylon 6T/2M-5T (PA6T/2M-5T, polyamide 6T/2M-5T), and the like. These may be used singly or in combination of two or more types thereof.

Further, as the component (C) according to the present composition, a polyamide resin may be used which contains a structure having the above-mentioned carbon number in a linear-chain part of more than 5 (simply referred to as "long chain structure" in the present invention) at the same time in addition to the short chain structure described above. That is, it is possible to use a polyamide resin in which the polyamide molecule has only a structure of both a short chain structure and a long chain structure. Examples of polyamide resin having only the structure of both the short chain structure and the long chain structure include nylon 610 (PA610, polyamide 610), nylon 611 (PA611, polyamide 611), nylon 612 (PA612, polyamide 612), polyamide 614 (PA614, polyamide 614), polyamide MXD 6 (PAMXD6, polyamide MXD 6), and the like. These polyamides may be used singly or in combination of two or more types thereof.

In the present composition, when using the polyamide resin having only the structure of both the short chain structure and the long chain structure in the present thermoplastic resin composition, the polyamide resin preferably contains short chain structure of an amount of more than 50% (more preferably 60% or more and 99% or less) with respect to the total of the short chain structure and the long chain structure.

In the present invention, the component (C) is preferably a polyamide resin containing more short chain structure than long chain structure. Therefore, as the component (C), a polyamide resin having substantially only a short chain structure can be used. In this case, the effect of the present invention can be obtained more effectively.

When a polyamide resin having both a short chain structure and a phenylene structure, or a polyamide resin having both a short chain structure and a long chain structure is used as the component (C), the effect of the present invention can be obtained more effectively in the case where a component (C) having a large ratio of the short chain structure is used.

Specifically, with respect to the total of all structures (sum of units) of a short chain structure (that is, can be described as a short chain unit), a phenylene structure (that is, can be described as a phenylene unit), and a long chain structure (that is, can be described as a long chain unit), the proportion (proportion based on number) of the short chain structure is preferably more than 50%, and more preferably 70% or more and 99% or less.

The number average molecular weight of the component (C) according to the present composition is not limited. It may be, for example, 5,000 or more and 100,000 or less, and is preferably 7,500 or more and 50,000 or less, and more preferably 10,000 or more and 50,000 or less.

The number average molecular weight of the component (C) is a number average molecular weight on polystyrene equivalent basis by gel permeation chromatography (GPC).

A monomer constituting the component (C) is not particularly limited, and a monomer capable of appropriately forming the above-mentioned short chain structure, phenylene structure, long chain structure, and the like as required may be used.

Specific examples of the monomer include amino acids such as 6-aminocaproic acid, 11-aminoundecanoic acid, 12-aminododecanoic acid, and paraaminomethylbenzoic acid, lactams such as ε-caprolactam, undecane lactam, and ω-lauryl lactam; and the like. These compounds may be used singly or in combination of two or more types thereof.

Furthermore, the component (C) can may be also one obtained by copolymerization of a diamine and a dicarboxylic acid. In this case, examples of the diamine as a monomer include an aliphatic diamine such as ethylenediamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diamino eicosane, 2-methyl-1,5-diaminopentane, and 2-methyl 1,8-diaminooctane; an alicyclic diamine such as cyclohexanediamine and bis-(4-aminocyclohexyl)methane; an aromatic diamine such as xylylenediamine (p-phenylenediamine, m-phenylenediamine, etc.); and the like. These compounds may be used singly or in combination of two or more types thereof.

Further, examples of the dicarboxylic acid as a monomer include an aliphatic dicarboxylic acid such as oxalic acid, malonic acid, succinic acid, glutaric acid, adipic acid, pimelic acid, suberic acid, azelaic acid, sebacic acid, undecanedioic acid, dodecanedioic acid, brasylic acid, tetradecanedioic acid, pentadecanoic acid, and octadecanedioic acid; an alicyclic dicarboxylic acid such as cyclohexane dicarboxylic acid; an aromatic dicarboxylic acid such as phthalic acid, terephthalic acid, isophthalic acid, and naphthalene dicarboxylic acid; and the like. These compounds may be used singly or in combination of two or more types thereof.

(4) Modified Elastomer (D)

The modified elastomer (D) (hereinafter, also referred to simply as "component (D)") is an elastomer having a group reactive with the component (C). The modified elastomer is preferably an elastomer further exhibiting an affinity for the component (C) by utilizing the reactive group as described above and simultaneously exhibiting an affinity for the component (B). That is, the component (D) is preferably a compatibilizer having a group reactive with the component (C) and having a compatibility with both the component (B) and the component (C).

In the present composition, the component (D) may be contained as an unreacted modified elastomer, or as a reactant with a component (C), and further the component (D) may be contained in both of these forms.

Examples of the reactive group include an acid anhydride group (—CO—O—OC—), a carboxyl group (—COOH), an epoxy group (—C$_2$O (a three-membered ring structure composed of two carbon atoms and one oxygen atom)), an oxazoline group (—C$_3$H$_4$NO), an isocyanate group (—NCO), and the like. These reactive groups may be contained singly or in combination of two or more types thereof.

The modified elastomer may be one obtained by introducing the reactive group to an elastomer before modification (unmodified elastomer) for modification. Specific examples of the modified elastomer include an acid-modified elastomer, an epoxy-modified elastomer, an oxazoline-modified elastomer, and the like. Among these, an acid-modified product of an elastomer is preferred. Further, a modified product of an elastomer with an acid anhydride or a carboxylic acid is more preferred.

It is particularly preferred that the component (D) has an acid anhydride group or a carboxyl group at a side chain or a terminal of the molecule. An amount of the acid modification amount is not particularly limited. For example, the number of acid anhydride groups or carboxyl groups contained in one molecule of the modified elastomer is preferably 1 or more, more preferably 2 or more and 50 or less, still more preferably 3 or more and 30 or less, and particularly preferably 5 or more and 20 or less. These modified elastomers may be used singly or in combination of two or more types thereof.

Examples of the unmodified elastomer before modification include an olefinic elastomer, a styrene-based elastomer, and the like. From a viewpoint of compatibility with the component (B), an olefinic elastomer is particularly preferable.

The olefinic elastomer is preferably an α-olefin copolymer containing a structural unit derived from an α-olefin having 3 to 8 carbon atoms, and example thereof includes an ethylene α-olefin copolymer, a copolymer of an α-olefin, an α-olefin non-conjugated diene copolymer, and an ethylene α-olefin non-conjugated diene copolymer. Of these, an ethylene α-olefin copolymer, a copolymer of an α-olefin, and an ethylene α-olefin non-conjugated diene copolymer are particularly preferable.

Examples of the non-conjugated diene include a linear non-cyclic diene compound such as 1,4-pentadiene, 1,4-hexadiene, 1,5-hexadiene and 1,6-hexadiene; a branched chain noncyclic diene compound such as 5-methyl-1,4-hexadiene, 3,7-dimethyl-1,6-octadiene, 5,7-dimethylocta-1,6-diene, 3,7-dimethyl-1,7-octadiene, 7-methyl octa-1,6-diene and dihydromyrcene; an alicyclic diene compound such as tetrahydroindene, methyltetrahydroindene, dicyclopentadiene, bicyclo[2.2.1]hepta-2,5-diene, 5-methylene-2-norbornene, 5-ethylidene-2-norbornene, 5-propenyl-2-norbornene, 5-isopropylidene-2-norbornene, 5-cyclohexylidene-2-norbornene and 5-vinyl-2-norbornene; and the like.

Specific examples of the olefin elastomer include an ethylene propylene copolymer, an ethylene 1-butene copolymer, an ethylene 1-pentene copolymer, an ethylene 1-hexene copolymer, an ethylene 1-octene copolymer, a propylene 1-butene copolymer, a propylene 1-pentene copolymer, a propylene 1-hexene copolymer, a propylene 1-octene copolymer, and the like. Of these copolymers, an ethylene propylene copolymer, an ethylene 1-butene copolymer and an ethylene 1-octene copolymer are preferred.

Examples of the styrene elastomer include a block copolymer of an aromatic vinyl compound and a conjugated diene compound, and a hydrogenated product thereof.

Examples of the aromatic vinyl compound include styrene; an alkylstyrene such as α-methylstyrene, p-methylstyrene, and p-tert-butylstyrene; p-methoxysteyrne, vinylnaphthalene, and the like.

Examples of the conjugated diene compound include butadiene, isoprene, 1,3-pentadiene, methylpentadiene, phenylbutadiene, 3,4-dimethyl-1,3-hexadiene, 4,5-diethyl-1,3-octadiene, and the like.

Specific examples of the styrene elastomer include a styrene butadiene styrene copolymer (SBS), a styrene isoprene styrene copolymer (SIS), a styrene ethylene/butylene styrene copolymer (SEBS), a styrene ethylene/propylene styrene copolymer (SEPS), and the like.

Examples of the acid anhydride for acid modification include maleic anhydride, phthalic anhydride, itaconic anhydride, succinic anhydride, glutaric anhydride, adipic anhydride, citraconic anhydride, tetrahydrophthalic anhydride, butenyl succinic anhydride, and the like. Of these, maleic anhydride, phthalic anhydride, and itaconic anhydride are preferred.

Examples of the carboxylic acid include acrylic acid, methacrylic acid, maleic acid, fumaric acid, itaconic acid, citraconic acid, and the like.

Among the above-mentioned various modified elastomers, the component (D) according to the present composition is preferably an acid anhydride-modified elastomer, particularly preferably a maleic anhydride-modified elastomer, and furthermore preferably an acid-modified product of an α-olefin copolymer containing a structural unit derived from α-olefin having 3 to 8 carbon atoms. Specifically preferable examples of the elastomer modified with maleic anhydride include a maleic anhydride-modified ethylene propylene copolymer, a maleic anhydride-modified ethylene 1-butene copolymer, a maleic anhydride-modified ethylene 1-hexene copolymer, a maleic anhydride-modified ethylene 1-octene copolymer, and the like. Specifically, α-olefin copolymer "TAFMER series" (trade name) manufactured by Mitsui Chemicals, Inc., "AMPLIFY series" (trade name) manufactured by Dow Chemical Company, and the like can be used.

The weight average molecular weight of the component (D) according to the present composition is not particularly limited. For example, it may be 10,000 or more and 500,000 or less, and is preferably 20,000 or more and 500,000 or less, and more preferably 30,000 or more and 300,000 or less.

The weight average molecular weight of the modified elastomer is a weight average molecular weight on polystyrene equivalent basis by gel permeation chromatography (GPC).

(5) Other Components

The present composition may consist only of the above-described components (A) to (D), but may contain other components in addition to these components. The other components may be used singly or in combination of two or more types.

As such other components, other thermoplastic resin may be used. Specific examples of the other thermoplastic resin include a polyester-based resin such as polybutylene terephthalate, polyethylene terephthalate, polycarbonate, polybutylene succinate, polyethylene succinate, and polylactic acid; and the like. These resins may be used singly or in combination of two or more types thereof.

In the case where other thermoplastic resin is contained, a content ratio of the other thermoplastic resin is preferably 25% by mass or less, more preferably 20% by mass or less, further preferably 15% by mass or less, still further preferably 10% by mass or less, particularly preferably 5% by mass or less, and 1% by mass or more, when a total amount of the components (A) to (D) and the other thermoplastic resin is 100% by mass.

Examples of additives that may be formulable include a nucleating agent, an antioxidant, a heat stabilizer, a weathering agent, a light stabilizer, a plasticizer, a ultraviolet absorber, an antistatic agent, a flame retardant, a slip agent, an antiblocking agent, an anti-fogging agent, a lubricant, a pigment, a dye, a dispersant, a copper inhibitor, a neutralizer, a foam inhibitor, a weld strength improver, a natural oil, a synthetic oil, a wax, and the like. These additives may be used singly or in combination of two or more types thereof.

<2> Phase Structure

The phase structure of the present composition is not limited, but usually has a continuous phase X and a dispersed phase Y (see FIG. 1). Of these, the continuous phase X is composed of the component (A) and the component (B). The dispersed phase Y is a phase dispersed in the continuous phase X, and is composed of the component (C) and the component (D).

Further, the dispersed phase Y may have ($Y_1$) a continuous phase in the dispersed phase and ($Y_2$) a dispersed phase in the dispersed phase (hereinafter, also referred to as "finely dispersed phase") (see FIG. 2). The continuous phase $Y_1$ in the dispersed phase and the finely dispersed phase $Y_2$ are usually composed of the component (C) and/or the component (D). For example, the following phase structures (1) to (4) are specifically exemplified. (1) A phase structure in which the continuous phase $Y_1$ in the dispersed phase is composed of the component (C) and the finely dispersed phase $Y_2$ is composed of the component (D). (2) A phase structure in which the continuous phase $Y_1$ in the dispersed phase is composed of the component (C), and the finely dispersed phase $Y_2$ is composed of both the component (C) and the component (D). (3) A phase structure in which the continuous phase $Y_1$ in the dispersed phase is composed of the component (D) and the finely dispersed phase $Y_2$ is composed of the component (C). (4) A phase structure in which the continuous phase $Y_1$ in the dispersed phase is composed of the component (D), and the finely dispersed phase $Y_2$ is composed of both the component (C) and the component (D). It should be noted that the dispersed phase Y having no continuous phase $Y_1$ in the dispersed phase or the finely dispersed phase $Y_2$ (non-combined dispersed phase Y) and the dispersed phase Y having the continuous phase $Y_1$ in the dispersed phase and the finely dispersed phase $Y_2$ (combined dispersed phase Y) may coexist.

Further, the component (D) may exist as an unreacted modified elastomer, may exist as a reaction product with the component (C) (a reaction product of the polyamide resin and the modified elastomer), or may exist as a mixture thereof.

The dispersed phase Y may have a boundary phase Z around it (see FIG. 3). The boundary layer Z is a phase located at a boundary between the continuous phase X and the dispersed phase Y. This boundary phase Z tends to be easily formed when a propylene ethylene block copolymer is used as the component (A) and/or the component (B). The thickness (width) of the boundary phase Z tends to increase as the proportion of the propylene ethylene block copolymer increases with respect to the total components of the component (A) and the component (B). From this, it is considered that all or a part of the boundary phase Z is formed by the ethylene block constituting the propylene ethylene block copolymer. The boundary phase Z can include a mixture of those having various thicknesses (thickness of the boundary layer Z). Further, the dispersed phase Y having the boundary phase Z and the dispersed phase Y having no boundary phase Z may coexist.

Various phase structures can be investigated by observation by a field-emission type scanning electron microscope (FE-SEM) on a treated surface of a test piece (a test piece made of the present thermoplastic resin composition) which was subjected to an oxygen plasma etching treatment and further subjected to an osmium coating treatment. In particular, the dispersed phase and the finely dispersed phase can be observed with images magnified 1,000 times or more (usually 10,000 times or less) in this method. In addition, components constituting each phase can be identified by performing energy dispersive X-ray analysis (EDS) at the time of observation using a field-emission type scanning electron microscope (FE-SEM).

In the case where the present composition has a dispersed phase Y, its size is not particularly limited. The dispersion diameter (average dispersion diameter) of the dispersed phase Y may be 10,000 nm or less, may be 50 nm or more and 8,000 nm or less, and further may be 100 nm or more and 4,000 nm or less.

The dispersion diameter of the dispersed phase Y may be measured in images magnified 1,000 times or more obtained using an electron microscope. That is, the longest diameter of each of the twenty dispersed phases Y randomly selected from a predetermined region in the image is measured, and the average value of the obtained longest diameters is taken as a first average value. Further, a further average value of the first average values measured in five different regions in the image is the average dispersion diameter (major-axis average dispersion diameter) of the dispersed phase Y.

In the case where the present composition has a finely dispersed phase $Y_2$, its size is not particularly limited. The dispersion diameter (average dispersion diameter) of the finely dispersed phase $Y_2$ may be 5 nm or more and 1,000 nm or less, may be 5 nm or more and 600 nm or less, and may be 10 nm or more and 400 nm or less, and may be particularly 15 nm or more and 350 nm or less.

The dispersion diameter of the finely dispersed phase $Y_2$ may be measured in images magnified 1,000 times or more obtained using an electron microscope. That is, the longest diameter of each of the twenty finely dispersed phases $Y_2$ randomly selected from a predetermined region in the image is measured, and the average value of the obtained longest diameters is taken as a first average value. Further, a further average value of the first average values measured in five different regions in the image is the average dispersion diameter (major-axis average dispersion diameter) of the finely dispersed phase $Y_2$.

<3> Formulation

In the present composition, a total content ratio of the component (A) and the component (B) is 70% by mass or more, when a total amount of the components (A) to (D) is 100% by mass. That is, the present composition is a composition having a high polyolefin content ratio of 70% by mass or more. Therefore, it can be said that the present composition is a thermoplastic composition based on a polyolefin. A composition having such a large proportion of polyolefin strongly exhibits properties of a polyolefin, but a tensile elongation of the tensile elongation percentage inherently possessed by polyolefin (100% polyolefin) is less than 50%. On the other hand, the present composition has a tensile elongation of 50% or higher while containing 70% by mass or more of polyolefin. In other words, it can be said that the present composition is a composition in which the tensile elongation of polyolefin is significantly modified by incorporating less than 30% by mass, in total, of the component (C) and the component (D).

The total content ratio of the component (A) and the component (B) only need to be 70% by mass or more when a total amount of the component (A) to the component (D) is 100% by mass, and the upper limit thereof may be 95% by mass or less. In this range, a particularly high tensile elongation can be obtained. The total content ratio may be 71% by mass or more, and further 72% by mass or more. On the other hand, the total content ratio may be 90% by mass or less, and further 87% by mass or less. In this range, a higher tensile elongation can be obtained.

In the present composition, when the total amount of the component (A) and the component (B), which are contained in a total content ratio of 70% by mass or more as described above, is 100% by mass, the component (A) is contained in an amount of 50% by mass or more and 87% by mass or less. That is, the component (A) is contained more when the component (A) and the component (B) contained in the present composition are compared.

The content ratio of the component (A) may be 52% by mass or more, further 55% by mass or more, further 58% by mass or more, and further 60% by mass or more, when a total amount of the component (A) and the component (B) is 100% by mass. On the other hand, the content ratio thereof may be 85% by mass or less, further 83% by mass or less, further 81% by mass or less, and further 80% by mass or less. In this range, a higher tensile elongation can be obtained.

More specifically, in the present composition, when the total amount of the four components (A) to (D) is 100% by mass, the content ratio of the component (A) may be more than 25% by mass, further 27% by mass or more, further 32% by mass or more, and further 37% by mass or more. On the other hand, the content ratio thereof may be less than 80% by mass, further 79% by mass or less, further 78% by mass or less, and further 77% by mass or less. In this range, a higher tensile elongation can be obtained.

In the present composition, when the total amount of the three components (B) to (D) is 100% by mass, the content ratio of the component (B) may be 2% by mass or more and 90% by mass or less. The content ratio thereof is preferably 5% by mass or more and 85% by mass or less, more preferably 10% by mass or more and 83% by mass or less, further preferably 15% by mass or more and 80% by mass or less, furthermore preferably 20% by mass or more and 78% by mass or less, still further 25% by mass or more and 75% by mass or less, still furthermore 30% by mass or more and 73% by mass or less, further 35% by mass or more and 70% by mass or less, and particularly 45% by mass or more and 65% by mass or less. In this range, a high tensile elongation can be obtained.

In the present composition, when the total amount of the three components (B) to (D) is 100% by mass, the total content ratio of the component (C) and the component (D) (some or all of them may be reacted with each other; the same applies below) may be 10% by mass or more and 98% by mass or less. The content ratio thereof is preferably 15% by mass or more and 95% by mass or less, more preferably 17% by mass or more and 90% by mass or less, further preferably 20% by mass or more and 85% by mass or less, furthermore preferably 22% by mass or more and 80% by mass or less, still further 25% by mass or more and 75% by mass or less, still furthermore 27% by mass or more and 70% by mass or less, further 30% by mass or more and 65% by mass or less, and particularly 35% by mass or more and 65% by mass or less. In this range, a high tensile elongation can be obtained.

In the present composition, when the total amount of the three components (B) to (D) is 100% by mass, the content ratio of the component (C) may be 1% by mass or more and 50% by mass or less. The content ratio thereof is preferably 3% by mass or more and 45% by mass or less, more preferably 5% by mass or more and 40% by mass or less, further preferably 6% by mass or more and 35% by mass or less, furthermore preferably 7% by mass or more and 30% by mass or less, still further 8% by mass or more and 28% by mass or less, still furthermore 9% by mass or more and 20% by mass or less, and particularly 10% by mass or more and 18% by mass or less. In this range, a high tensile elongation can be obtained.

In the present composition, when the total amount of the three components (B) to (D) is 100% by mass, the content ratio of the component (D) may be 1% by mass or more and 60% by mass or less. The content ratio of the component (D) is preferably 5% by mass or more and 53% by mass or less, more preferably 10% by mass or more and 45% by mass or less, further preferably 15% by mass or more and 40% by mass or less, furthermore preferably 17% by mass or more and 38% by mass or less, still further 20% by mass or more and 37% by mass or less, still furthermore 23% by mass or more and 36% by mass or less, and particularly 26% by mass or more and 35% by mass or less. In this range, a high tensile elongation can be obtained.

In the present composition, when the total amount of the component (B) and the component (C) is 100% by mass, the content ratio of the component (C) may be 1% by mass or more and 90% by mass or less. The content ratio of the component (C) is preferably 3% by mass or more and 80% by mass or less, more preferably 5% by mass or more and 70% by mass or less, further preferably 6% by mass or more and 55% by mass or less, furthermore preferably 7% by mass or more and 45% by mass or less, still further 8% by mass or more and 40% by mass or less, still furthermore 9% by mass or more and 35% by mass or less, and particularly 10% by mass or more and 30% by mass or less. In this range, a high tensile elongation can be obtained.

In the present composition, when the total amount of the two components (C) and (D) is 100% by mass, the content ratio of the component (D) may be 1% by mass or more and 99% by mass or less. The content ratio of the component (D) is preferably 5% by mass or more and 80% by mass or less, more preferably 10% by mass or more and 60% by mass or less, further preferably 15% by mass or more and 55% by mass or less, furthermore preferably 20% by mass or more and 50% by mass or less, still further 23% by mass or more and 45% by mass or less, and particularly 25% by mass or more and 40% by mass or less. In this range, a high tensile elongation can be obtained.

When the present composition has a predetermined phase structure as described above, the content ratio of each component according to the present composition can be calculated approximately from types of the components constituting each phase and the area ratio between the respective phases. That is, the area ratio between the respective phases can be calculated from the analysis of the above-described FE-SEM image (however, the magnification may be 1000 times or less). This area ratio is an approximate volume ratio. Then, the area ratio can be converted using the densities of the respective components into the content ratios of the components constituting each phase. For example, when the component (A) is a propylene ethylene block copolymer (for example, 0.90 to 0.91 g/cm$^3$), the component (B) is a homopolypropylene (for example, 0.90 to 0.91 g/cm$^3$), the component (C) is PA6 (for example, 1.12 to 1.13 g/cm$^3$), the component (D) is a maleic acid-modified EBR (for example, 0.86 to 0.88 g/cm$^3$), the area ratio of the continuous phase X and boundary phase Z to the dispersed phase Y is 5:5, and the area ratio of the continuous phase $Y_1$ in the dispersed phase $Y_2$ to the finely dispersed phase in the dispersed phase Y is 5:5, the total content ratio of the component (A) and the component (B), when the total amount of the four components (A) to (D) is 100% by mass, can be approximately calculated as 47.6% by mass.

According to the present composition, a high tensile elongation can be obtained. Specifically, the tensile elongation as measured by the method shown in Examples which will be described later can be 50% or higher and 1,000% or lower, further 100% or higher and 850% or lower, further 150% or higher and 700% or lower, further 200% or higher and 650% or lower, further 230% or higher and 600% or lower, and further 250% or higher and 550% or lower.

In particular, when the content of the component (A) is in a range from 35% to 80% by mass, the content of the component (B) is in a range from 10% to 40% by mass, the content of the component (C) is in a range from 2% to 12% by mass, and the content of the component (D) is in a range from 5% to 25% by mass, with respect to 100% by mass of the total amount of the components (A) to (D), the tensile elongation can be 200% or higher (usually, 1,000% or lower). Further, when the content of the component (A) is in a range from 35% to 70% by mass, the content of the component (B) is in a range from 20% to 45% by mass, the content of the component (C) is in a range from 5% to 12% by mass, and the content of the component (D) is in a range from 10% to 25% by mass, with respect to 100% by mass of the total amount of the components (A) to (D), the tensile elongation can be 400% or higher (usually, 1,000% or lower).

2. Method for Producing Thermoplastic Resin Composition

The present production method of the present composition in the invention is characterized by including a second composition preparation step and a third composition preparation step. In the present production method, a third composition obtained by the third composition preparation step becomes usually the present composition. Each of the four components (A) to (D), their content ratios, and the like are as described above. The blending proportions and blending amounts of the components in the present production method are usually the same as the content ratios and content of each of the components in the present composition described above. It is not necessary to consider volatilization or disappearance of the four components (A) to (D) in the production process.

The "second composition preparation step" is a step in which a first composition and the component (B) are subjected to melt-kneading to prepare a second composition.

The first composition is a composition obtained by melt-kneading the component (C) and the component (D). That is, the first composition is a melt-kneaded product of the component (C) and the component (D).

The second composition is a composition obtained by melt-kneading the first composition and the component (B). That is, the second composition is a melt-kneaded product of the first composition and the component (B).

The "third composition preparation step" is a step in which the component (A) and the second composition are subjected to melt-kneading to prepare a third composition.

The third composition is a composition obtained by melt-kneading the second composition and the component (A). That is, the third composition is a melt-kneaded product of the second composition and the component (A).

The melt kneading in these steps refers to performing a kneading of substances in a melted or softened state. While the specific temperature therefor is not limited, both the melt kneading for obtaining the first composition, the melt kneading for obtaining the second composition (melt kneading in the second composition preparation step), and the melt kneading for obtaining the third composition (melt kneading in the third composition preparation step) may be performed at, for example, 190° C. or higher and 350° C. or lower. In particular, from a viewpoint of obtaining the first composition, the melt kneading in this temperature range can promote a reaction between the reactive group in the component (D) and the component (C). These melt-kneading steps may be further carried out at 200° C. or higher and 300° C. or lower, and is particularly preferably 205° C. or higher and 260° C. or lower.

In each melt-kneading step, any melt-kneading apparatus may be used. For example, it is possible to use an extruder (single screw extruder, twin screw kneading extruder, etc.), a kneader, a mixer (high speed flow mixer, paddle mixer, ribbon mixer, etc.) and the like. These apparatuses may be used singly, or may be used in combination of two or more thereof. In addition, when two or more types of apparatuses are used, they may be operated continuously or batchwise. Furthermore, the raw materials may be mixed all at once, or may be mixed by adding and charging in plural separate parts (multistage compounding).

It is considered that, in the present production method, the first composition is formed in advance to promote the reaction between the component (C) and the component (D), so that particles in which the component (C) and the component (D) are satisfactorily reacted (hereinafter, simply referred to as "reaction particle") are formed. That is, it is considered that good-quality reaction particles can be formed by reacting substantially only the component (C) and the component (D). When the mechanism is described predictively, it is considered that, when the melt-kneading is started, particles in which the reactive group of the modified elastomer is reacted with the surface of the polyamide resin particles are formed, but that, upon application of a shearing force during the melt kneading, the particles are sheared, so that the unreacted polyamide resin in the particles is exposed on the surface of the particles. Then, it is considered that the unreacted component (C) reacts with the exposed unreacted polyamide resin. It is considered that the high-quality reaction particles as described above are formed by repeating this situation. Furthermore, it is considered that reaction particles having a smaller particle size can be stably formed without relying on a high shear.

A small amount of the component (D) that is supplied in the above process is considered to make a reaction difficult to proceed and to make the reaction particles difficult to become small. Therefore, it is considered preferable that the component (D) which can be supplied be necessary and sufficient.

As described above, the respective steps may be carried out continuously or in a batch manner. For example, when the respective steps are carried out in a batch manner, the melt-kneading step for obtaining the first composition need not be continuous with the second composition preparation step. In this case, the first composition can be solidified (pelletized or the like) once. That is, a solid first composition can be obtained. Therefore, in this case, in the second composition preparation step, the solid first composition and the solid component (B) are melt-kneaded. In this case, the solid first composition and the solid component (B) may have a pellet shape, a lump shape, a powder shape, or any other shape. In any case, they are preferably finely divided so that they can be easily mixed.

Similarly, the second composition obtained in the second composition preparation step can be continuously used in the third composition preparation step without solidification, but can also be solidified once. In this case, in the third composition preparation step, the solid second composition and the solid component (A) are melt-kneaded. In this case, the solid second composition and the solid component (A) may have a pellet shape, a lump shape, a powder shape, or any other shape. In any case, they are preferably finely divided so that they can be easily mixed.

3. Molded Article

The molded article of the present invention is characterized by containing the present composition as a resin component.

The present composition constituting the present molded article is as described above. The present molded article may be a solid molded article or a foamed article. The present molded article may be formed by any method, and the method is not particularly limited. For example, the thermoplastic resin composition may be subjected to injection molding, extrusion molding (sheet extrusion, profile extrusion), T-die molding, blow molding, injection blow molding, inflation molding, hollow molding, vacuum molding, compression molding, press molding, stamping molding, transfer molding, or the like. These methods may be used singly in combination of two or more thereof.

The present molded article may consist of only the present composition, but may have a part other than the present composition. Examples of the part other than the present composition include a core material part. More specifically, the molded article may have a core material part formed from a resin other than the present composition, a core material part formed from a material other than a resin such as metal, or the like. These core material parts may be introduced, for example, by insert molding.

In addition, the shape and dimensions such as size and thickness of the molded article are not particularly limited, and the application of the molded article is not particularly limited. The molded article can be used as, for example, exterior materials, interior materials, structural materials, impact absorbing materials for automobiles, railway vehicles, marine vessels, airplanes, or the like. Among them, examples of automobile supplies include exterior materials for automobiles, interior materials for automobiles, structural materials for automobiles, shock absorbers for automobiles, components in engine rooms, and the like. Specific examples of automobile supplies includes bumper, spoiler, cowling, front grille, garnish, hood, cargo room lid, cowl louver, fender panel, rocker molding, door panel, roof panel, instrument panel, center cluster, door trim, quarter trim, roof lining, pillar garnish, deck trim, tonneau board, package tray, dashboard, console box, kicking plate, switch base, seat back board, seat frame, arm rest, sun visor, intake manifold, engine head cover, engine under cover, oil filter housing, housing for on-vehicle electronic component (ECU, TV monitor, etc.), air filter box, and the like.

Further, examples of the application of the molded article include interior materials, exterior materials, and structural materials for buildings or furniture. That is, the molded article can be a door covering material, a door structural material, a covering material of various types of furniture (desk, chair, shelf, chest of drawers, etc.), structural material, and the like. In addition, the molded article can be used as a packaging body, an accommodating body (tray etc.), a protecting member, a partition member, and the like. Further, the molded article can be a molded article such as housings and structures for household electric appliances (slim-type TV, refrigerator, washing machine, vacuum cleaner, mobile phone, portable gaming console, laptop computer, etc.).

4. Method for Producing Molded Article

The method for producing a molded article in the present invention includes the following (1) first method and (2) second method.

The first method (1) is characterized by including a third composition preparation step and a molding step.

Of these steps, the third composition preparation step is a step in which the component (A) and a second composition containing the three components (B) to (D) are subjected to melt-kneading to obtain the third composition.

The molding step is a step in which the third composition is subjected to molding to obtain a molded article.

On the other hand, the second method (2) includes a molding step. This molding step is a step in which a melt-kneaded product of the component (A) and the second composition containing the three components (B) to (D) are subjected to molding to obtain a molded article.

The difference between the first method and the second method is whether or not the third composition is prepared for molding. That is, in the first method, the third composition is molded after preparation of the third composition. Therefore, it is possible to solidify the third composition, which is a melt-kneaded product of the second composition and the component (A), to obtain the third composition as a master batch suitable for molding (for example, pellet shape, etc.). Then, this third composition is put into a molding machine to perform molding.

On the other hand, in the second method, a melt-kneaded product of the second composition and the component (A) (a composition in a state of being left melt-kneaded without being solidified) is molded as it is. That is, in the second method, the melt-kneaded product of the second composition and the component (A) can be directly molded without forming a masterbatch suitable for molding (for example, after dry-blending of the solid second composition and the solid component (A), the mixture of these solids is melt-kneaded and molded).

Generally, the first method can be adopted to prevent uneven distribution of the second composition and the component (A) in the obtained molded article. In this respect, in the production of the present molded article, the second method can be positively selected. That is, even when molding is performed by the second method, uneven distribution of the second composition and the component (A) in the molded article can be sufficiently prevented. The reason why an excellent molded article can be obtained even when the master batch (third composition) for molding is not prepared in this way is considered to be because the total content ratio of the component (A) and the component (B) is as large as 70% by mass or more, when the total amount of the four components (A) to (D) is 100% by mass. That is, conversely, the reason is considered to be because the total content ratio of the component (C) and the component (D) is as small as less than 30% by mass.

The second method can be used to reduce the number of melt-kneading steps by one and to obtain a molded article having an excellent tensile elongation.

In these methods, the second composition is obtained by melt-kneading the first composition obtained by melt-kneading the component (C) and the component (D), and the component (B), as in the case of the method for producing the present composition.

5. Modifying Agent

The modifying agent of the present invention (hereinafter, also referred to simply as "present modifying agent") is a modifying agent that improves a tensile elongation of a resultant thermoplastic resin composition by being added to the component (A). Specifically, it is a modifying agent capable of modifying the component (A) so that the tensile elongation is 50% or higher. The present modifying agent is characterized by containing the component (B), the component (C), and the component (D).

The four components (A) to (D) are the same as those in the present composition described above. The content ratios, content, and the like of each of the components are the same as those in the above-described composition. Further, this modifying agent may be obtained as the second composition in the above-described method for producing the present composition and the above-described method for producing the present molded article.

In the present modifying agent, when the total amount of the three components (B) to (D) is 100% by mass, the content ratio of the component (B) may be 2% by mass or more and 90% by mass or less. The content ratio thereof is preferably 5% by mass or more and 85% by mass or less, more preferably 10% by mass or more and 83% by mass or less, further preferably 15% by mass or more and 80% by mass or less, furthermore preferably 20% by mass or more and 78% by mass or less, still further 25% by mass or more and 75% by mass or less, still furthermore 30% by mass or more and 73% by mass or less, further 35% by mass or more and 70% by mass or less, and particularly 45% by mass or more and 65% by mass or less. In this range, a high tensile elongation can be obtained in a thermoplastic resin composition after modification and a molded article thereof.

In the present modifying agent, when the total amount of the three components (B) to (D) is 100% by mass, the content ratio of the component (C) and the component (D) (some or all of them may be reacted with each other; the same applies below) may be 10% by mass or more and 98% by mass or less. The content ratio thereof is preferably 15% by mass or more and 95% by mass or less, more preferably 17% by mass or more and 90% by mass or less, further preferably 20% by mass or more and 85% by mass or less, furthermore preferably 22% by mass or more and 80% by mass or less, still further 25% by mass or more and 75% by mass or less, still furthermore 27% by mass or more and 70% by mass or less, further 30% by mass or more and 65% by mass or less, and particularly 35% by mass or more and 65% by mass or less. In this range, a high tensile elongation can be obtained in a thermoplastic resin composition after modification and a molded article thereof.

In the present modifying agent, when the total amount of the three components (B) to (D) is 100% by mass, the content ratio of the component (C) may be 1% by mass or more and 50% by mass or less. The content ratio thereof is preferably 3% by mass or more and 45% by mass or less, more preferably 5% by mass or more and 40% by mass or less, further preferably 6% by mass or more and 35% by mass or less, furthermore preferably 7% by mass or more and 30% by mass or less, still further 8% by mass or more and 28% by mass or less, still furthermore 9% by mass or more and 20% by mass or less, and particularly 10% by mass or more and 18% by mass or less. In this range, a high tensile elongation can be obtained in a thermoplastic resin composition after modification and a molded article thereof.

In the present modifying agent, when the total amount of the three components (B) to (D) is 100% by mass, the content ratio of the component (D) may be 1% by mass or more and 60% by mass or less. The content ratio of the component (D) is preferably 5% by mass or more and 53% by mass or less, more preferably 10% by mass or more and 45% by mass or less, further preferably 15% by mass or more and 40% by mass or less, furthermore preferably 17% by mass or more and 38% by mass or less, still further 20% by mass or more and 37% by mass or less, still furthermore 23% by mass or more and 36% by mass or less, and particularly 26% by mass or more and 35% by mass or less. In this range, a high tensile elongation can be obtained in a thermoplastic resin composition after modification and a molded article thereof.

In the present modifying agent, when the total amount of the component (B) and the component (C) is 100% by mass, the content ratio of the component (C) may be 1% by mass or more and 90% by mass or less. The content ratio of the component (C) is preferably 3% by mass or more and 80% by mass or less, more preferably 5% by mass or more and 70% by mass or less, further preferably 6% by mass or more and 55% by mass or less, furthermore preferably 7% by mass or more and 45% by mass or less, still further 8% by mass or more and 40% by mass or less, still furthermore 9% by mass or more and 35% by mass or less, and particularly 10% by mass or more and 30% by mass or less. In this range, a high tensile elongation can be obtained in a thermoplastic resin composition after modification and a molded article thereof.

In the present modifying agent, when the total amount of the two components (C) and (D) is 100% by mass, the content ratio of the component (D) may be 1% by mass or more and 99% by mass or less. The content ratio of the component (D) is preferably 5% by mass or more and 80% by mass or less, more preferably 10% by mass or more and 60% by mass or less, further preferably 15% by mass or more and 55% by mass or less, furthermore preferably 20% by mass or more and 50% by mass or less, still further 23% by mass or more and 45% by mass or less, and particularly 25% by mass or more and 40% by mass or less. In this range, a high tensile elongation can be obtained in a thermoplastic resin composition after modification and a molded article thereof.

6. Modification Method

The modification method of the present invention (hereinafter, also referred to simply as "present modification method") is a modification method in which a tensile elongation of a resultant thermoplastic resin composition is improved by adding a specific modifying agent to the component (A). Specifically, it is a modification method capable of modifying the component (A) so that the tensile elongation is 50% or higher. The modifying agent used in this modification method contains the component (B), the component (C), and the component (D).

The four components (A) to (D) are the same as those in the present composition described above. The content ratios, content, and the like of each of the components are the same as those in the above-described composition. Further, this modifying agent may be obtained as the second composition in the above-described method for producing the present composition and the above-described method for producing the present molded article.

The present modification method may include (1) a first method and (2) a second method, in the same manner as in the above-described method for producing the present molded article.

Specifically,

- the first method (1) includes: a third composition preparation step in which the modifying agent and the component (A) are subjected to melt-kneading to obtain a third composition; and a molding step of molding the third composition to obtain a molded article (modified molded article), and the second method (2) includes a molding step in which the modifying agent and the component (A) are subjected to molding to obtain a molded article (modified molded article).

The difference between the first method and the second method is whether or not the third composition is prepared for molding. That is, in the first method, the third composition is molded after formation of the third composition. Therefore, it is possible to solidify the third composition, which is a melt-kneaded product of the second composition and the component (A), to obtain the third composition as a master batch suitable for molding (for example, pellet shape, etc.). Then, this third composition is put into a molding machine to perform molding.

On the other hand, in the second method, a melt-kneaded product of the second composition and the component (A) (a composition in a state of being left melt-kneaded without being solidified) is molded as it is. That is, in the second method, the melt-kneaded product of the second composition and the component (A) can be directly molded without forming a masterbatch suitable for molding (for example, after dry-blending of the solid second composition and the solid component (A), the mixture of these solids is melt-kneaded and molded).

Generally, the first method can be adopted to prevent uneven distribution of the second composition and the component (A) in the obtained molded article. In this respect, in the production of the present molded article, the second method can be positively selected. That is, even when molding is performed by the second method, uneven distribution of the second composition and the component (A) in the molded article can be sufficiently prevented. The reason why an excellent molded article can be obtained even when the master batch (third composition) for molding is not prepared in this way is considered to be because the total content ratio of the component (A) and the component (B) is as large as 70% by mass or more, when the total amount of the four components (A) to (D) is 100% by mass. That is, conversely, the reason is considered to be because the total content ratio of the component (C) and the component (D) is as small as less than 30% by mass.

As described above, the second method can be used to reduce the number of melt-kneading steps by one and to obtain a molded article having an excellent tensile elongation.

In these methods, the second composition is obtained by melt-kneading the first composition obtained by melt-kneading the component (C) and the component (D), and the component (B), as in the case of the method for producing the present composition.

EXAMPLES

Hereinafter, the present invention will be specifically described by way of examples.

[1] Preparation of Thermoplastic Resin Composition and Preparation of Test Piece (1) Preparation of Thermoplastic Resin Composition Pellets of the following component (C) polyamide resin and pellets of the following component (D) modified elastomer were dry-blended. Then, the obtained pellet mixture was charged into a twin-screw melt kneading extruder (manufactured by Coperion GmbH, screw diameter: 50 mm, L/D=48). Kneading was conducted under conditions of a kneading temperature of 210° C., an extrusion rate of 150 kg/hour, and a screw rotation speed of 500 rpm and a pelletizer was used to obtain pellets (first composition) made of a melt-kneaded product of the component (C) and the component (D) (first composition preparation step).

Subsequently, the obtained pellets (first composition) and pellets of the following component (B) polyolefin resin were dry-blended. Then, the obtained pellet mixture was charged into a twin-screw melt kneading extruder (manufactured by Coperion GmbH, screw diameter: 50 mm, L/D=48). Kneading was conducted under conditions of a kneading temperature of 210° C., an extrusion rate of 150 kg/hour, and a screw rotation speed of 500 rpm and a pelletizer was used to obtain pellets (pellet-shaped modifying agent, modifying agent pellets) made of a second composition (modifying agent) (second composition preparation step).

(2) Molding of Test Piece for Evaluation (Experimental Examples 1 to 9)

The pellets obtained in the above (1) (pellet-shaped modifying agent, modifying agent pellets) and the pellets of the following component (A) polyolefin resin were dry-blended in the blending proportions for Experimental Examples 2 to 8 described in Table 1 below. Then, the obtained pellet mixture was charged into an injection molding machine (manufactured by Nissei Plastic Industrial Co., Ltd., 40-ton injection molding machine), and injection molding was conducted under injection conditions of a set temperature of 210° C. and a mold temperature of 40° C., to obtain test pieces for evaluation for Experimental Examples 2 to 8 (molding step).

Only the pellets of the component (A) polyolefin resin were subjected to injection molding in the same manner to obtain a test piece for evaluation for Experimental Example 1.

Subsequently, pellets of the first composition and pellets of the component (B) polyolefin resin were dry-blended. Then, the obtained pellet mixture was charged into an injection molding machine (manufactured by Nissei Plastic Industrial Co., Ltd., 40-ton injection molding machine), and injection molding was conducted under injection conditions of a set temperature of 210° C. and a mold temperature of 40° C., to obtain a test piece for evaluation for Experimental Example 9.

TABLE 1

| | | Experimental Example | | | | | | | | |
|---|---|---|---|---|---|---|---|---|---|---|
| | | 1 | 2 | 3 | 4 | 5 | 6 | 7 | 8 | 9 |
| Component (A) | Polypropylene (block PP) | 100 | 97 | 95 | 93 | 90 | 75 | 60 | 40 | 0 |
| Component (B) | Polypropylene (Homo PP/ Mn: 520.000) | 0 | 1.65 | 2.75 | 3.85 | 5.5 | 13.8 | 22.0 | 33.0 | 55.0 |
| Component (C) | Polyamide (PA6) | 0 | 0.45 | 0.75 | 1.05 | 1.5 | 3.73 | 6.0 | 9.0 | 15.0 |
| Component (D) | Modified elastomer (maleic anhydride modified EBR) | 0 | 0.90 | 1.50 | 2.10 | 3.0 | 7.50 | 12.0 | 18.0 | 30.0 |
| Total polyolefin content ratio | | 100 | 98.7 | 97.8 | 96.9 | 95.5 | 88.8 | 82.0 | 73.0 | 55.0 |
| Tensile elongation (%) | | 24 | 40 | 58 | 73 | 83 | 299 | >500 | 426 | 374 |
| Tensile strength (MPa) | | 19 | 19 | 18 | 18 | 18 | 17 | 17 | 19 | 18 |
| Impact strength (kJ/m$^2$) | | 12 | 12 | 13 | 27 | 45 | 71 | 85 | 99 | 106 |

(3) Details of Components (A) to (D)

Component (A)/polyolefin resin: Propylene ethylene block copolymer, copolymer, number average molecular weight: less than 350,000, MFR: 60 g/10 min.

Component (B)/polyolefin resin: Polypropylene resin, homopolymer, number average molecular weight: 520,000, MFR: 3 g/10 min.

Component (C)/polyamide resin: Nylon 6 resin (polyamide resin having only a short chain structure), number average molecular weight: 18,000

Component (D)/modified elastomer: Maleic anhydride-modified ethylene butene copolymer (modified EBR), manufactured by Mitsui Chemicals, Inc., product name "TAFMER MH7020", MFR (230° C.): 1.5 g/10 min.

[2] Evaluation of Test Piece for Evaluation (1) Measurement of Tensile Elongation Using test pieces with type A1 (dumbbell type) specified in JIS K 7139, which were obtained through the above [1], tensile elongation and tensile strength were measured at a tensile speed of 50 mm/min in accordance with JIS K 7161. The results are shown in Table 1. The tensile elongation of Experimental Example 7, ">500" shown in Table 1 indicates that it exceeded the measurement upper limit, 500%.

Furthermore, the correlation between the total content ratio of polyolefin contained in the test piece for evaluation of each of the experimental examples and the tensile elongation (open circle in the graph), and the correlation between the total content ratio of polyolefin and the tensile strength (solid triangle in the graph) are shown as a graph in FIG. 4.

(2) Measurement of Charpy Impact Strength

Using test pieces for evaluation of Experiment Examples 1 to 9 obtained in the above [1], Charpy impact strength was measured according to JIS K 7111-1. The results are shown in Table 1. In the measurement of Charpy impact strength, test pieces having a notch (type A) were used, and the impact strength was measured by the edgewise test method at a temperature of 23° C.

Furthermore, the correlation between the total content ratio of polyolefin contained in the test piece for evaluation of each of the experimental examples and the Charpy impact strength (solid square in the graph) is shown as a graph in FIG. 4.

[3]. Effect of Example

It is found, from results shown in Table 1 and FIG. 4, that when the thermoplastic composition containing the components (B) to (D) (second composition, that is, modifying agent) is used as a modifying agent for the component (A), the tensile elongation of the obtained molded article is remarkably improved. In other words, it is found that the thermoplastic composition containing the components (A) to (D) (third composition) has remarkably excellent tensile elongation.

In particular, tensile strengths (solid square in the graph) did not change depending on the total polyolefin content ratio, and were almost constant in Experimental Examples 1 to 9. On the other hand, Charpy impact strengths (solid triangle in the graph) were remarkably improved when the amount of the second composition added exceeded 5% by mass. But its improvement was relatively gentle when the amount thereof added became 15% by mass or more. Moreover, it is found that tensile elongations (open circle in the graph) were extremely dramatically increased when the amount of the second composition added was in the range from more than 0% by mass up to 50% by mass. A particularly remarkable improvement in tensile elongation was observed when the amount of the second composition added is in the range from more than 10% by mass up to 40% by mass. Further, it is found that tensile elongations exceeded the tensile elongation, 374%, intrinsically possessed by the thermoplastic composition containing the components (B) to (D) (second composition, that is, modifying agent), when the amount of the second composition added exceeds about 24% by mass.

From the various measurement results so far, the morphology observed through the following test method is considered to exhibit the phase structure shown in FIG. 3 in any of Experimental Examples 2 to 8. Further, it is considered that the continuous phase X is composed of the component (A) (or the polypropylene component of the component (A)) and the component (B); that the dispersed phase Y is composed of the component (C) and a part of the component (D), and that the boundary phase Z is composed of the polyethylene component of the component (A) and a part of the component (D). It is considered that the dispersed phase Y has the continuous phase $Y_1$ in the dispersed phase and the finely dispersed phase $Y_2$; that the continuous phase $Y_1$ in the dispersed phase is composed of other parts of the component (D); and that the finely dispersed phase $Y_2$ is composed of the component (C).

The above test method is as follows. The fracture surface of each of the test pieces in Experimental Examples 2 to 8 is subjected to oxygen plasma etching treatment at 100 W for 1 minute, followed by osmium coating treatment, and is observed with a field-emission type scanning electron microscope ("JSM-7100F TTL LV" manufactured by JEOL Ltd.) to obtain an image (FE-SEM image). In addition, the components constituting each phase are specified by performing energy dispersive X-ray analysis (EDS) at the time of the above FE-SEM observation. From these results, the phase structure was specified.

The above-mentioned examples are for illustrative purposes only and are not to be construed as limiting the invention. While the invention has been described by way of examples of typical embodiments, it is understood that the language used in the description and illustration of the present invention is to be regarded as explanatory and illustrative and not restrictive. Modifications within the scope of the appended claims are possible without departing from the scope or spirit of the invention in its form as detailed herein. Although reference has been made herein to specific structures, materials and examples in the detailed description of the present invention, it is not intended to limit the invention to the disclosure set forth herein, but rather, to cover all functionally equivalent structures, methods, and uses within the scope of appended claims.

REFERENCE SIGNS LIST

X: Continuous phase
Y: Dispersed phase
$Y_1$: Continuous phase in dispersed phase
$Y_2$: Finely dispersed phase (dispersed phase in dispersed phase)
Z: Boundary phase

The invention claimed is:

1. A molded article obtained by molding a thermoplastic resin composition comprising:
   (A) a first polyolefin resin with a number average molecular weight of less than 350,000;
   (B) a second polyolefin resin with a number average molecular weight of 350,000 or more;
   (C) a polyamide resin having a structure in which a carbon number of a linear chain part of a hydrocarbon group sandwiched between adjacent amide bonds in its main chain is 5 or less; and
   (D) a modified elastomer having a reactive group with the polyamide resin (C);
   wherein:
   a total content ratio of the component (A) and the component (B) is 70% by mass or more, a content ratio of the component (A) is from 35% to 70% by mass, a content ratio of the component (B) is from 20% to 45% by mass, a content ratio of the component (C) is from 5% to 12% by mass, and a content ratio of the component (D) is from 10% to 25% by mass, when a total amount of the component (A), the component (B), the component (C), and the component (D) is 100% by mass %;
   a content ratio of the component (A) is 50% by mass or more and 87% by mass or less, when a total amount of the component (A) and the component (B) is 100% by mass %; and
   a tensile elongation is between 400% and 1000%.

2. The molded article according to claim 1, wherein a content ratio of the component (D) is 50% by mass or more, when a total amount of the component (C) and the component (D) is 100% by mass.

3. The molded article according to claim 1, wherein the component (C) is selected from the group consisting of nylon 6, nylon 66, nylon 46, nylon 6T, nylon 6I, nylon M5T, nylon M5I, and copolymers thereof.

4. The molded article thermoplastic resin composition according to claim 1, wherein the component (D) is an olefin-based thermoplastic elastomer having a skeleton of a copolymer of ethylene or propylene and an α-olefin having 3 to 8 carbon atoms, or a styrene-based thermoplastic elastomer having a styrene skeleton.

5. A method for producing the molded article according to claim 1, comprising:
   preparing a third composition in which the component (A) and a second composition comprising the component (B), the component (C) and the component (D) are subjected to melt-kneading to obtain the third composition; and
   molding the third composition to obtain the molded article.

6. A method for producing the molded article according to claim 1, comprising molding a melt-kneaded product of the component (A) and a second composition comprising the component (B), the component (C) and the component (D) to obtain the molded article.

7. The method for producing the molded article according to claim 5, wherein the second composition is a composition obtained by melt-kneading the component (B) and a first composition obtained by melt-kneading the component (C) and the component (D).

* * * * *